United States Patent [19]

Cheng

[11] Patent Number: 4,909,491
[45] Date of Patent: Mar. 20, 1990

[54] SAW PLATFORM AND WORKBENCH

[76] Inventor: Wen H. Cheng, No. 12-2, Alley 1, Lane 437, Bar-te Road, Sec. 2, Taipei, Taiwan

[21] Appl. No.: 308,131

[22] Filed: Feb. 8, 1989

[51] Int. Cl.4 .............................................. B25B 1/10
[52] U.S. Cl. .................................... 269/16; 269/139; 269/220; 269/283; 269/901; 269/67
[58] Field of Search .................. 269/139, 71, 84, 244, 269/901, 88, 219-221; 144/286 R, 286 A; 108/6

[56] References Cited

U.S. PATENT DOCUMENTS

| | | | |
|---|---|---|---|
| 1,044,816 | 11/1912 | Phillipson | 144/288 R |
| 2,704,235 | 3/1955 | Bion | 108/6 |
| 3,494,306 | 2/1970 | Aguilar | 108/6 |
| 3,561,713 | 2/1971 | Berkowitz | 108/6 |
| 4,095,778 | 6/1978 | Wing | 269/139 |
| 4,278,243 | 7/1981 | Alessia | 269/139 |

Primary Examiner—Robert C. Watson
Attorney, Agent, or Firm—Ostrolenk, Faber, Gerb & Soffen

[57] ABSTRACT

A sawing platform and workbench includes a stand portion and a platform supported by the stand portion. A pair of adjusting plates fixed to opposite ends of the platform adjust the height and angle of the platform. Each adjusting plate has first and second spaced, vertical slots formed therein to permit vertical movement of the platform. The second slot of each of the adjusting plates includes an arcuate slot formed in the adjusting plate continuous with the second slot to permit angular movement of the platform. An adjusting rod includes a first end portion contained within each of the first and second slots to limit vertical movement of the platform over a distance substantially equal to the length of the vertical slots and to limit angular movement of the platform over a range commensurate with the length of the arcuate slots. A second end portion of the adjusting rod is fixed to the stand portion. Locking means lock the platform at a desirable height and angle.

15 Claims, 6 Drawing Sheets

SAW PLATFORM AND WORKBENCH

BACKGROUND OF THE INVENTION

The present invention relates to a new structure for a saw platform and a workbench which includes an adjustable work platform and a foldable stand. The height and angle of the work platform are adjustable.

Various types of workbenches have been disclosed in U.S. Pat. No. 4,415,149 dated Nov. 15, 1923, entitled "Portable workbench there is disclosed a portable workbench which includes a folding frame capable of being folded into a relatively small package for convenient transport, and into a work position where the working surface is horizontal. The disclosed art comprises a vise member having a mounting shaft, a stationary jaw and a movable jaw, and, a screw for moving the movable jaw toward and away from the stationary jaw.

In U.S. Pat. No. 4,199,135 dated Apr. 22, 1980 issued to Wohrle et al. entitled "Foldable workbench" there is disclosed a workbench having a pair of rigid wooden work plates bridging and fixed to a pair of transverse support elements. The plate has a substantially planar surface and formed with a plurality of bores centered on a bore axis perpendicular to the respective surface.

It has been found that the above known workbenches have limited usefulness and are not capable of meeting the user's requirements. Besides, the above known workbenches are large in size and complicated in structure. Thus, the cost of production is high.

SUMMARY OF THE INVENTION

It is therefore an object of the invention to provide an improved structure of a workbench which mitigates the above drawbacks.

Yet another object of the present invention is to provide an improved structure of a workbench which has a simple structure and can be used for a variety of working purposes.

Still another object of the present invention is to provide an improved structure of a workbench having a foldable supporting frame and a light weight which can be easily manufactured and conveniently carried along.

It is still another object of the invention to provide an improved structure of a workbench having a platform in which the angle and height thereof can be adjusted. Thus, it provides users with a vertical work tool actively.

For a better understanding of the invention, and to show how the same may be carried into effect, reference will now be directed, by way of example, to the accompanying drawings.

DESCRIPTION OF THE PREFERRED EMBODIMENTS

Figure 1:
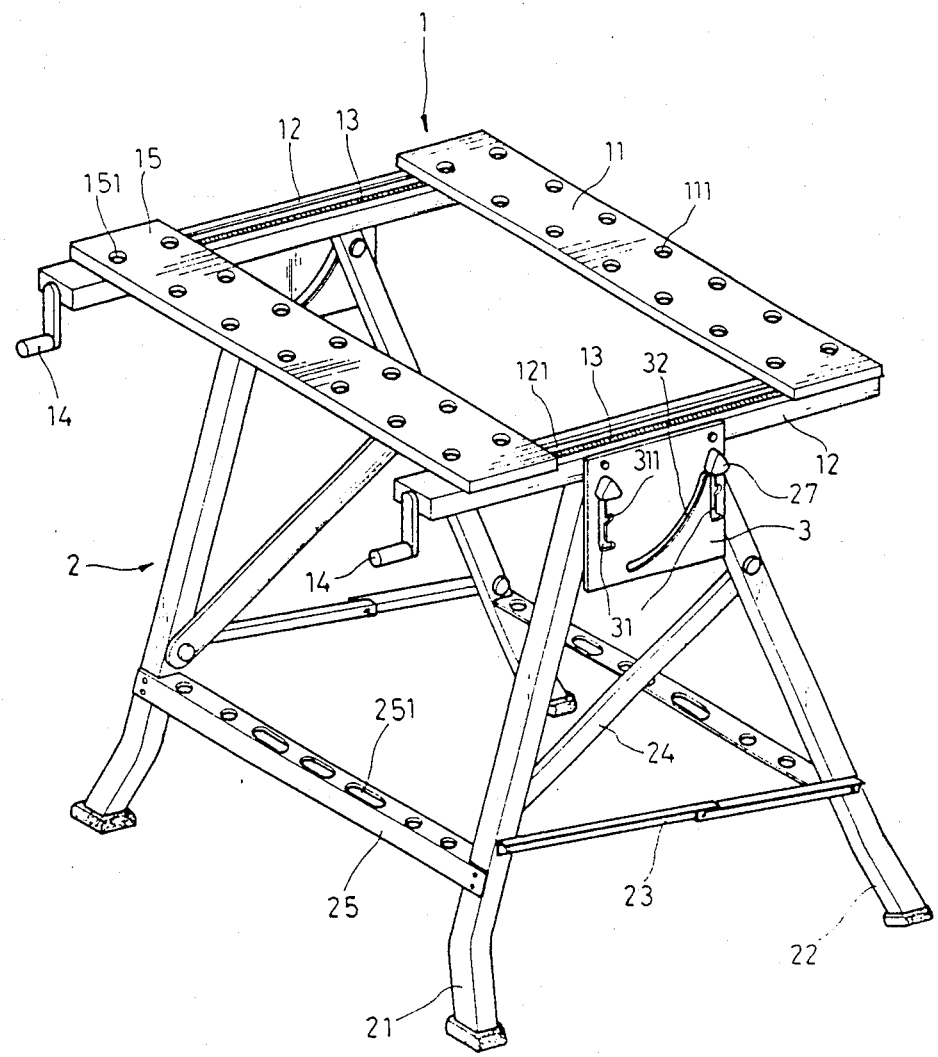
FIG. 1 is a perspective view of a sawing platform and a workbench according to the invention.

Referring to the drawings, FIG. 1 shows a sawing platform and a workbench comprising three main portions, i.e. a workbench (1), a stand portion (2) and a fixation means. The workbench (1) comprises two supporting frames (12), a fixed platform (11) and a movable platform (15). The two supporting frames (12) are mounted in parallel, wherein the centers thereof are provided with a directing channel (121) adapted for the installation of a screw rod (13). The front end of the respective screw rod (13) is extended outside the channel (121) and each end is provided with a crank (14) for rotating the screw rod (13) within a directing channel (121). The fixed platform (11) vertically lies across the end of said supporting frames (12) and are provided with a plurality of spaced fixing holes (111). The movable platform (15) is parallel with the fixed platform (11).

Figure 2:
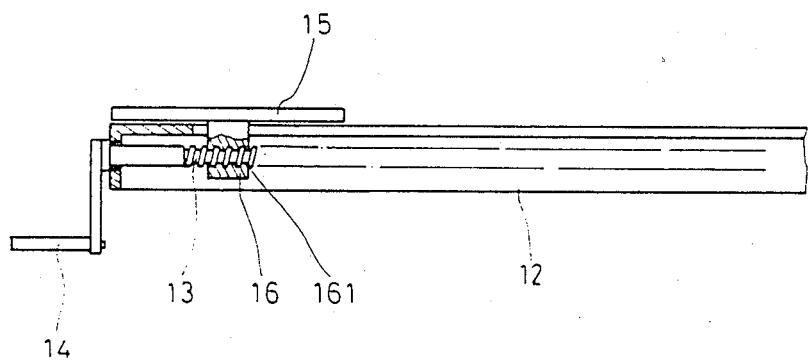
FIG. 2 is a side elevational view of the sawing platform and a workbench of FIG. 1.

Referring to FIG. 2, the bottom end of movable platform (15) is provided with a directing block (16) having screw holes (161) adapted to be used in combination with the screw rod (13). That is to say, when the crank (14) drives the screw rod (13), the movable platform (15) will move horizontally due to the screwed combination of the directing block (16). Thus, the distance between the fixed platform (11) and the movable platform (15) will be changed. A plurality of holes (151) are provided on the movable platform (15).

Figure 3:
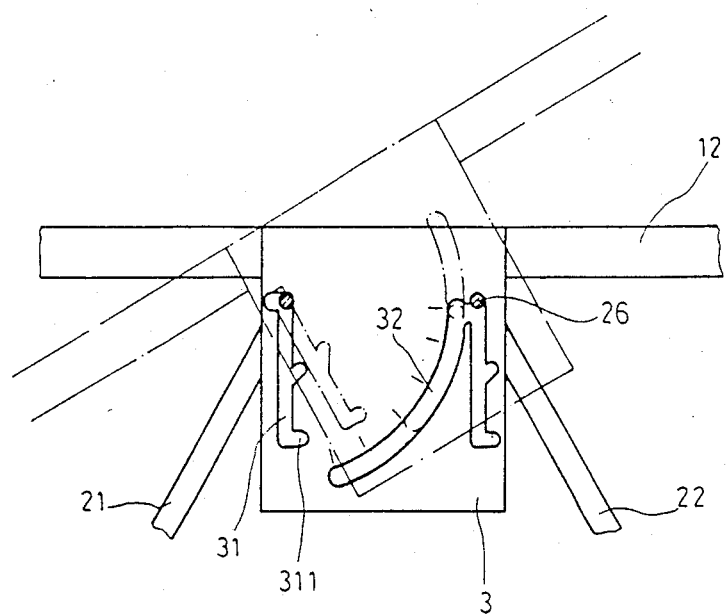
FIG. 3 is a schematic view showing the adjusted angle in accordance with the present invention.
Figure 4:
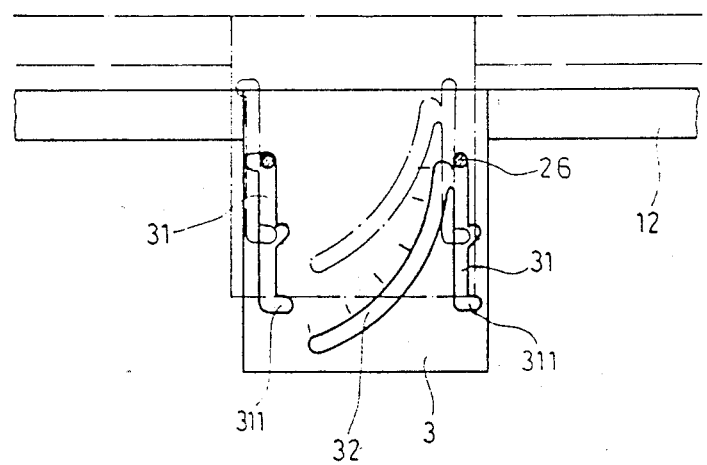
FIG. 4 is a schematic view indicating the adjusted height in accordance with invention.

The stand portion (2) includes two front stands (21) and two rear stands (22) which form an A-shaped frame to support the platform. Between the two front and rear stands (21) (22), two supporting rods (25) having a plurality of holes (251) are respectively mounted to said stands (21) (22). At the upper end of said stands (21) (22), outwardly protruding screws (26) which protrude outward are respectively mounted. (As shown in FIGS. 3, 4). The connection of the supporting rods (25) can be screwed tightly with the packing block (27).

Adjusting plates (3) are respectively mounted to the external of the supporting frames (12) and is provided with two groups of symmetrical fixing slots (31). Locking slots (311) are provided along the fixing slots (31). A circlar slot (32) having marked readings is provided at the fixing slot (31) near the fixed platform (11). The screws (26) at the upper part of said stands are screwed within the fixing slots (31). Therefore, by the screws (26) engaging the locking slot (311), the height and the inclined angle of the platform (1) can easily be adjusted to a desirable requirement.

The clamping device is a fixing plate (81). A plurality of circular holes are provided for the installation of various tools, such as saw blades, and for the replacement of other clamping equipments, which can easily be mounted in between the platforms. The mounting and disassembly of the various tools is simple. Therefore, it facilitates easy operation for workers.

Figure 5:
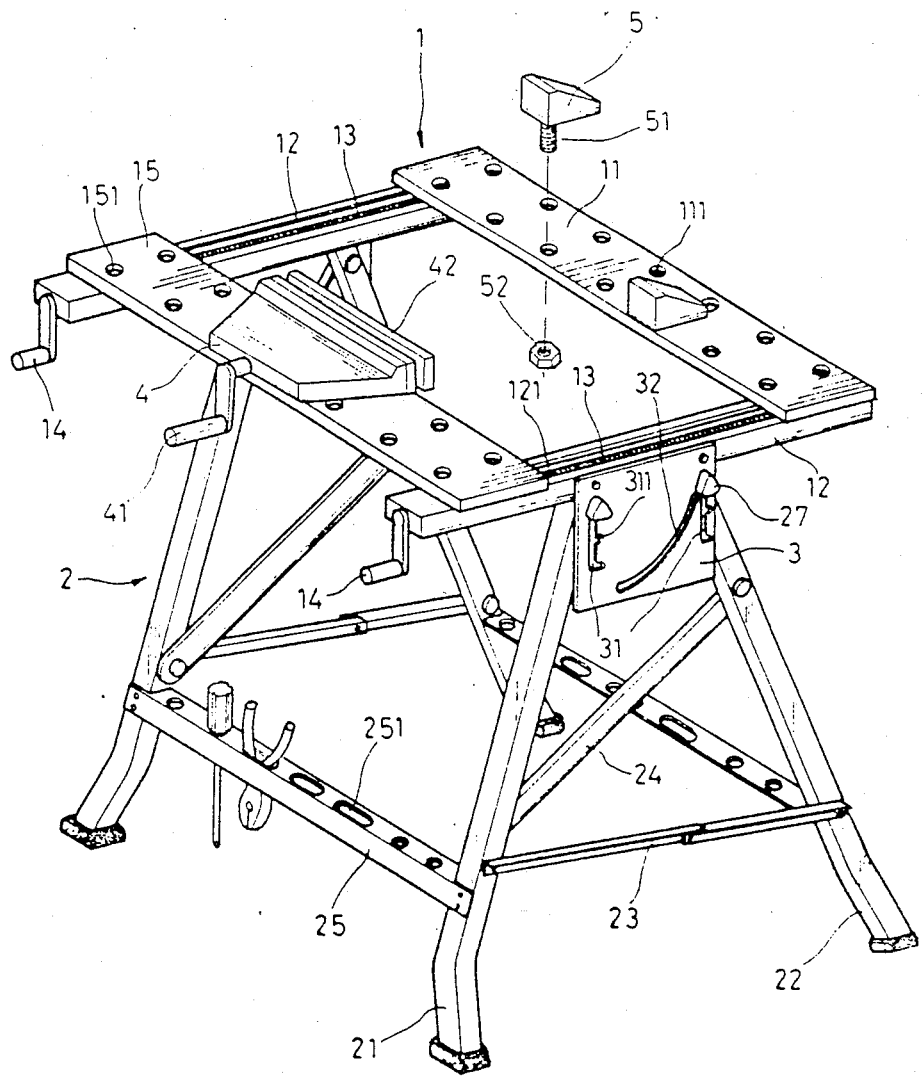
FIGS. 5-7 are perspective views of the preferred embodiments according to the invention.
Figure 7:
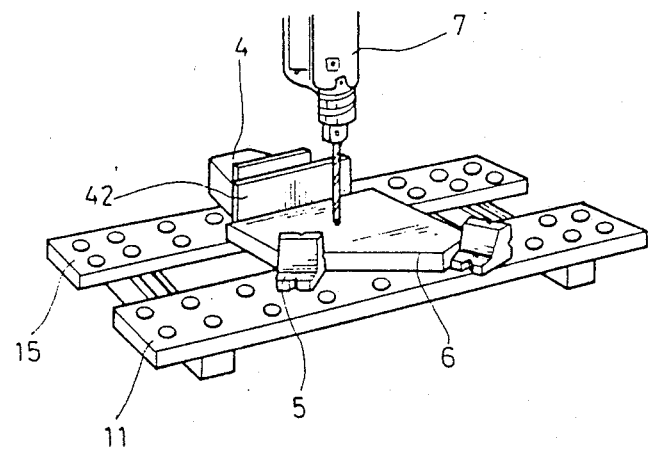
Figure 6:
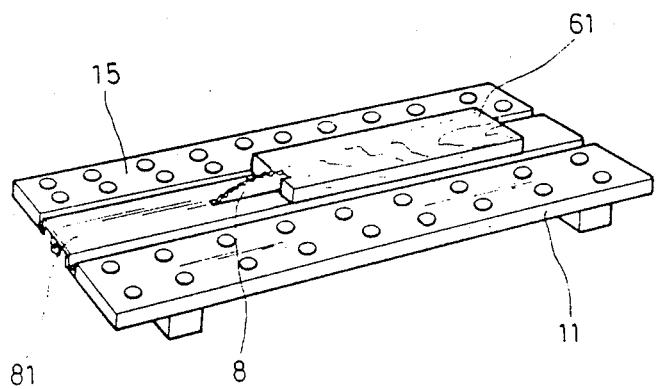
Figure 8:
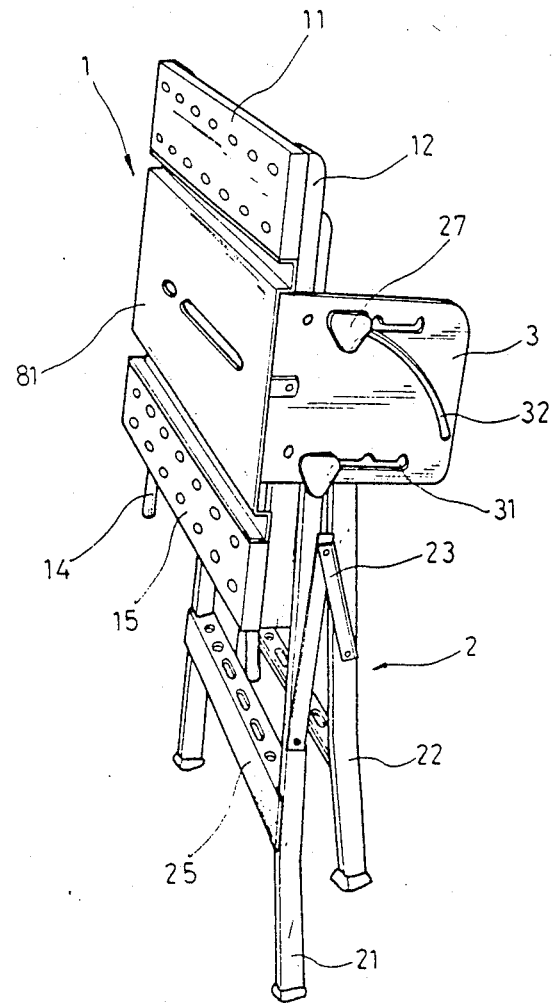
FIG. 8 is a perspective view of the preferred embodiment after folding in according with the invention.

Referring to FIG. 5, a vise (4) can be inserted and mounted to the fixing holes (151) of the movable platform (15). A screw rod (51) of a stopper (5) can be inserted in any fixing hole (11) and fastened with nut (52). Therefore, various types of tools (6) (61) having different incline angles can be tightly clamped for use in connection with drills (7) and screw blades. As shown in FIG. 6, another fixing plate (81) can be inserted between platform (11), (15). A plurality of holes are provided on the plate (81) for the installation of tool manufacturing machines. When the workbench is not in use, the foldable rod (23) is pulled up, thus enabling the stands (2) to be retracted as shown in FIG. 8.

Those skilled in the art will readily recognize that various portable safety devices can be used in combination with the present invention. Accordingly, the embodiment illustrated and discussed hereinabove should be understood to be exemplary only in nature, and the scope of the instant invention should be limited only by that of the following claims.

I claim:

1. A sawing platform and workbench comprising:
a stand portion;
a platform supported by said stand portion; and,
means to adjust the height and angle of the platform including plate means having first and second spaced, vertical slots formed therein to permit vertical movement of said platform, said second slot of each of said adjusting plates including an arcuate slot formed in said adjusting plate continuous with said second slot to permit angular movement of said platform; and an adjusting rod connected to said stand portion projecting through each of said first and second slots to limit vertical and angular movement of said platform.

2. The sawing platform and workbench of claim 1 wherein said plate means includes a pair of adjusting plates fixed to opposite ends of said platform.

3. The sawing platform and workbench of claim 1 wherein said adjusting rod includes a first end portion projecting through each of said first and second slots and a second end portion fixed to said stand portion, said first end portion limiting vertical movement of said platform over a distance substantially equal to the length of said vertical slots, and limiting angular movement of said platform over a range commensurate with the length of said arcuate slots.

4. The sawing platform and workbench of claim 3 further comprising locking means to lock said platform at a desirable height and angle.

5. The sawing platform and workbench of claim 4 wherein said locking means includes locking slots formed in said adjusting plates continuous with said vertical slots to engage said first end portions of said adjusting rods to block vertical movement of said platform after said platform has been set at a desired height.

6. The sawing platform and workbench of claim 3 further comprising means to move said first end portions of said adjusting rods projecting through said second slots to project through said arcuate slots to adjust the angle of said platform.

7. The sawing platform and workbench of claim 4 wherein said locking means includes means to prevent movement of said platform after said platform has been set at a desirable angle.

8. The sawing platform and workbench of claim 1 wherein said platform includes a first portion and a second portion movable with respect to said first portion and, means to move said second portion with respect to said first portion.

9. The sawing platform and workbench of claim 8 wherein said platform includes a fixing plate disposed between said first and second portions of said platform to adapt the sawing platform and workbench for use in connection with machine tools.

10. The sawing platform and workbench of claim 9 wherein said fixing plate includes a slot formed therein adapted to receive a saw blade.

11. The sawing platform and workbench of claim 1 wherein said platform includes means to attach accessories to said platform.

12. The sawing platform and workbench of claim 11 wherein said means to attach includes a receptacle formed in said platform to receive and retain the accessories.

13. The sawing platform and workbench of claim 1 wherein said stand portion is constructed in accordance with an A-frame configuration.

14. The sawing platform and workbench of claim 13 wherein said A-frame includes two front stands fixed to the opposite ends of said platform to support one side of said platform, two rear stands fixed to the opposite ends of said platform to support the opposite side of said platform, and a foldable rod joining each front stand with its respective opposite rear stand.

15. The sawing platform and workbench of claim 14 wherein the sawing platform and workbench is foldable to a more compact state when said foldable rods are caused to be folded.

* * * * *